3,726,805
PROCESS FOR THE PRODUCTION OF AMINO ACID-CONTAINING MICROCAPSULES

Yukio Maekawa, Shizuo Miyano, and Asaji Kondo, Saitama, Japan, assignors to Fuji Photo Film Co., Ltd., Kanagawa, Japan
No Drawing. Filed Mar. 17, 1971, Ser. No. 125,385
Claims priority, application Japan, Mar. 17, 1970, 45/22,508
Int. Cl. A61j 3/07; B01j 13/02; B44d 1/02
U.S. Cl. 252—310                                    11 Claims

ABSTRACT OF THE DISCLOSURE

A process for producing amino acid-containing microcapsules which comprises melting a hardened oil having a melting point of higher than 40° C. and dispersing therein a powdered water-soluble amino acid to provide a first dispersion, dispersing said first dispersion in a solvent mixture of methanol and a polyhydric alcohol to form a second dispersion, said solvent mixture being heated to a temperature higher than the melting point of said hardened oil, and cooling said second dispersion to a temperature lower than the melting point of the hardened oil to thereby form said microcapsules.

BACKGROUND OF THE INVENTION

Field of the invention

The present invention relates to a process for producing water-soluble amino acid (or salt thereof) containing micro-capsules using a hardened oil as the microcapsule wall. More particularly, the present invention relates to a proces for producing amino acid-containing microcapsules by dispersing, in a heated alcohol medium, a hardened oil containing fine powder of an amino acid and cooling the dispersion.

Description of the prior art

A process of producing a water-soluble material contained in microcapsules of a meltable waxy material is disclosed in, e.g., the specification of U.S. Pat. No. 3,161,-602. In this process, an inert liquid such as silicone oil or a fluorinated oily material is used as the encapsulation medium, and a synthetic or natural waxy material is used as the wall material for the microcapsule. The waxy material is melted by heating and solidified at normal temperature, and these properties are utilized in preparing the microcapsules.

However, as a result of experimentation, it was impossible to produce microcapsules of amino acid with a hardened oil which can be orally administered to humans or animals. That is, since the inert liquid used as the encapsulation medium is expensive and has a nature of considerably dissolving the hardened oil which forms the shell of the microcapsule, it is impossible to make discrete capsules having a uniform diameter and also to remove the medium from the microcapsules. Therefore edible microcapsules cannot be produced by such a known process as disclosed in the above-mentioned specification.

It is therefore a primary object of this invention to provide a method for encapsulating a water-soluble amino acid by a hardened oil, whereby the amino acid is protected until the shell of the hardened oil is ruptured by digestive action.

SUMMARY OF THE INVENTION

As the result of various investigations, the present inventors have discovered that a mixture of methanol and a polyhydroxy alcohol scarcely dissolves a hardened oil and thus can be used most suitably as the encapsulation medium for the above-mentioned purposes.

DESCRIPTION OF THE PREFERRED EMBODIMENTS

The microcapsules prepared by this invention have a diameter of from 10 microns to 3 millimeters, in which a fine powder of an amino acid is encapsulated and protected by the film or shell of the hardened oil.

A significant feature of the present invention is that because the viscosity of methanol is lower than water and that of the polyhydric alcohol is higher than that of water, the viscosity of the encapsulating medium in this invention can be adjusted desirably for the encapsulation by properly mixing both members. The ratio of methanol and polyhydric alcohol serves to control the specific gravity and viscosity of the amino acid-containing microcapsules, and therefore discrete microcapsules are obtained without coagulation. The preferable weight ratio of methanol to polyhydric alcohol is 1:5 to 5:1, more preferably 1:3 to 3:1.

Another feature of this invention is that the encapsulation medium can be readily and completely removed, by water washing, methanol washing or air drying. The cooling temperature of the system for removing the medium is from room temperature (25° C.) to the setting point (45–46° C.) or melting point (40° C.) of the hardened oil.

According to the process of the present invention, a thermally unstable amino acid can be encapsulated without the necessity of adjustment of the pH.

A general process for making microcapsules by the present invention will be set forth below.

A finely crushed amino acid is added to a melted hardened oil and dispersed homogeneously by stirring to form a first dispersion. Then, the first dispersion is dispersed in an alcoholic medium heated to a temperature of higher than the melting point of the hardened oil to form a second dispersion. The production of the second dispersion may be conducted by means of stirring or by application of ultrasonic waves. When the particles in the second dispersion reach a diameter of from 10 microns to 3 millimeters, the temperature of the system is immediately lowered to solidify the hardened oil, thereby obtaining spherical microcapsules containing the amino acid as the core material and having shells of the hardened oil.

The shape and size of the microcapsules formed by the present process can be controlled by the stirring conditions, the viscosity and the specific gravity of the alcoholic medium, the kind of additives, and the utilization of a surface active agent.

The hardened oil used in this invention should have a melting point of lower than 100° C., be stable to heat, one which does not denature the amino acid, and one which can be ruptured by a digestive enzyme of humans or other mammals. As such a hardened oil, an animal hardened oil such as hardened fish oil, a hardened whale oil, a hardened beef tallow, hardened herring oil, hardened cod liver oil, or a hardened vegetable oil such as a hardened castor oil, hardened coconut oil, hardened palm kernel oil, hardened palm oil, hardened cotton seed oil, hardened peanut oil, hardened soybean oil and hardened olive oil, each oil having a melting point of from 40° C. to 80° C., may be used. These hardened oils may be used alone or in combination.

The encapsulation medium used in the process of this invention is preferably one which neither dissolves nor denatures the hardened oil and the amino acid, is stable to heat, and has a viscosity of from 30 cp. to 300 cp. when heated to a temperature of from 40° C. to 95° C. As the encapsulation medium satisfying such conditions, a mixture of methanol and a suitable proportion of a polyhydric alcohol such as ethylene glycol, propylene glycol, glycerine and the like is preferably used.

When the second dispersion is prepared by dispersing the first one in the encapsulation medium, the weight ratio of the first dispersion to the encapsulation medium is from about 1/2 to about 1/10, preferably from 1/3 to 1/5. In this case, it is easy to desirably control the size of the particles in the second dispersion.

For controlling the specific gravity of the microcapsules formed, an inorganic or organic stable fine powder may be added to the hardened oil as an additive with a preferred specific gravity for the microcapsules being 0.85–1.02. The fine powder used in this case has a size of from 20 millimicrons to 30 microns and usually comprises powdered kaolin, clay, barium sulfate, calcium carbonate, chromium sesquioxide, starch, or crystalline cellulose. The fine powder is preferably used in an amount of from 1 to 20% by weight to the hardened oil. Also, in order to improve the various properties of the shells of the hardened oil, such as to improve the plastics, hardness, water resistance and resistance to organic solvents of the films, many kinds of additives which are harmless to humans and animals and which are miscible with the hardened oil may be used. Examples of such additives are modified rosins, low molecular weight polyethylene (molecular weight: 1000–3000), waxes, arachis oil, castor oil, olive oil, and soya-bean oil, e.g., low molecular weight polyethylene has the effect of hardening the film, and improving its lustre, resistance to water and organic solvents, while olive oil and castor oil has the effect of making the film more plastic. These additives may be used alone or as a combination thereof. The proportion of such additives is from 1 to 30% by weight of the hardened oil.

As the water-soluble amino acid protected or encapsulated as a core material, there are essential amino acids such as L-valine, L-leucine, L-isoleucine, L-threonine, L-phenylalanine, L-tryptophane, L-lysine, DL-methionine, L-histidine, L-alginine, etc., and also L-glutamine, L-glutamic acid, L-asparagine, L-aspartic acid, L-glutamic acid, sodium L-glutamate, and sodium L-aspartate. The size of the powder of the amino acid encapsulated by the process of this invention is from 1/10 to 500 microns, preferably from about 1 micron to about 100 microns. Also, better results are obtained when the amount of the amino acid is from 1 to 80 percent by weight, preferably from 5 percent to 40 percent by weight, based on the weight of the hardening oil which forms the shell of the microcapsule.

The amino acid-containing microcapsules produced by the process of this invention may be used as nutrient for ruminants. For instance, when a feed containing the microcapsules prepared by encapsulating DL-methionine with a hardened beef tallow was fed to an ox, the DL-methionine safely reached the abomasum while being completely protected from bacteria present in the rumination stomach and the DL-methionine was almost completely taken by the ox.

The present invention will be illustrated in more detail by reference to the following non-limiting examples.

EXAMPLE 1

75 parts by weight of a beef tallow hardened oil (made by Kao Sekken K. K.) having a melting point of 58° C.±2° C. was melted by heating to 75° C. 25 parts by weight of DL-methionine (made by Nippon Kayaku K. K.) having a size distribution of 0.1–20 microns was added to the molten beef tallow with stirring to provide a first dispersion. The first dispersion obtained was dispersed in 300 parts by weight of an encapsulation medium prepared by mixing propylene glycol and methanol in a volume ratio of 2 to 1 with stirring at 70° C. and when the particles in the second dispersion reached a definite size, the temperature of the system was immediately lowered to 40° C., thereby forming microcapsules in which DL-methionine was protected or encapsulated by the hardened oil. The sizes of the microcapsules were from about 0.5 mm. to about 1 mm., i.e., the grain sizes of the product were uniform.

EXAMPLE 2

10 parts by weight of kaolin and 25 parts by weight of DL-methionine were uniformly dispersed in 65 parts by weight of the beef tallow as mentioned in Example 1. The first dispersion thus obtained was then dispersed in 400 parts by weight of an encapsulation medium consisting of a mixture of glycerine and methanol in a volume ratio of 2 to 1 at 70° C. and when the system was cooled to 40° C., spherical microcapsules of 1–2 mm. in diameter were obtained.

EXAMPLE 3

67 parts by weight of a hardened whale oil having a melting point of 53° C. and 8 parts by weight of olive oil were melted by heating and 25 parts by weight of L-lysine was uniformly dispersed therein to provide a first dispersion. The dispersion thus obtained was uniformly dispersed in 300 parts by weight of an encapsulation medium consisting of propylene glycol and methanol in a volume ratio of 2 to 1 heated to 55° C.; and then, by cooling the system to 40° C., microcapsules having a good spherical shape and a diameter of 1–2 mm. were obtained.

EXAMPLE 4

25 parts by weight of DL-methionine and 5 parts by weight of chromium sesquioxide were dispersed in hardened castor oil having a melting point of 84° C. to provide a first dispersion. The first dispersion was dispersed in an encapsulation medium (consisting of propylene glycol and methanol in a ratio of 2 to 1 by volume) and by cooling the system to 40° C., good microcapsules were obtained.

What is claimed is:

1. A process for producing amino-acid-containing microcapsules which comprises melting a hardened oil having a melting point of higher than 40° C. and lower than 100° C. and dispersing therein a powdered water-soluble amino acid to provide a first dispersion, dispersing said first dispersion in a solvent mixture of methanol and a polyhydric alcohol having a viscosity higher than water to form a second dispersion, said solvent mixture being heated to a temperature higher than the melting point of said hardened oil, and cooling said second dispersion to a temperature lower than the melting point of the hardened oil to thereby form said microcapsules.

2. The process of claim 1 wherein said amino acid is selected from the group consisting of L-valine, L-leucine, L-isoleucine, L-threonine, L-phenylalanine, L-tryptophane, L-lysine, DL-methionine, L-histidine, L-alginine, L-glutamine, L-glutamic acid, L-asparagine, L-aspartic acid, sodium L-glutamate acid and sodium L-aspartate.

3. The process of claim 1 wherein the size of the powdered amino acid is from 1 micron to 100 microns.

4. The process of claim 1 wherein the amount of said amino acid present is from 5% to 40% by weight, based on the weight of the hardened oil.

5. The process of claim 1 wherein said hardened oil is selected from the group consisting of hardened beef tallow, hardened castor oil, and hardened whale oil.

6. The process of claim 1 wherein said polyhydric alcohol is selected from the group consisting of ethylene glycol, propylene glycol and glycerine.

7. The process of claim 1 wherein the mixing ratio of said first dispersion to said solvent mixture is from ½ to 1/10 by weight.

8. The process of claim 1 wherein said second dispersion is cooled to a temperature of between 40° C. and 25° C.

9. The process of claim 1 wherein the weight ratio of methanol to polyhydric alcohol in said solvent mixture is from 1:5 to 5:1.

10. The process of claim 1 wherein said solvent mixture has a viscosity of from 30 to 300 centipoises.

11. The process of claim 1, wherein said hardened oil is hardened animal oil or hardened vegetable oil.

References Cited

UNITED STATES PATENTS

| | | | |
|---|---|---|---|
| 2,875,130 | 2/1959 | Grass, Jr. et al. | 424—38 X |
| 3,082,154 | 3/1963 | Allan | 117—100 A X |
| 3,161,602 | 12/1964 | Herbig et al. | 252—316 |
| 3,265,629 | 8/1966 | Jensen | 252—316 |
| 3,541,204 | 11/1970 | Sibbald et al. | 424—38 |

RICHARD D. LOVERING, Primary Examiner

U.S. Cl. X.R.

99—2 R, 14, 166; 117—100 A; 252—314; 424—38, 319